United States Patent
Thompson et al.

(10) Patent No.: US 7,339,516 B2
(45) Date of Patent: Mar. 4, 2008

(54) METHOD TO PROVIDE GRAPHICAL REPRESENTATION OF SENSE THROUGH THE WALL (STTW) TARGETS

(75) Inventors: Scott Randall Thompson, Hermosa, SD (US); Bernt Askild Askildsen, Rapid City, SD (US)

(73) Assignee: RealTronics Corporation, Rapid City, SD (US)

( * ) Notice: Subject to any disclaimer, the term of this patent is extended or adjusted under 35 U.S.C. 154(b) by 160 days.

(21) Appl. No.: 11/164,173

(22) Filed: Nov. 14, 2005

(65) Prior Publication Data

US 2007/0035436 A1 Feb. 15, 2007

Related U.S. Application Data

(60) Provisional application No. 60/595,870, filed on Aug. 11, 2005.

(51) Int. Cl.
*G01S 13/00* (2006.01)
*G01S 13/78* (2006.01)
(52) U.S. Cl. .......................... 342/22; 342/27; 342/45; 342/55; 342/90; 342/179; 342/182
(58) Field of Classification Search .................. 342/45, 342/55, 90, 179, 182, 22, 27
See application file for complete search history.

(56) References Cited

U.S. PATENT DOCUMENTS

| | | | |
|---|---|---|---|
| 2,984,915 A | 5/1961 | Bomzer et al. ................. | 434/4 |
| 3,229,018 A | 1/1966 | Balding et al. ................. | 434/4 |
| 3,413,402 A | 11/1968 | Marrero .......................... | 434/4 |
| 4,384,286 A | 5/1983 | DiToro ........................ | 345/442 |
| 4,944,679 A | 7/1990 | Allen et al. ..................... | 434/2 |
| 5,519,410 A | 5/1996 | Smalanskas et al. ........... | 345/7 |
| 5,550,560 A | 8/1996 | Kanada et al. .............. | 345/158 |
| 5,602,597 A | 2/1997 | Bertram ...................... | 345/158 |
| 5,606,374 A | 2/1997 | Bertram ...................... | 345/158 |
| 5,616,031 A | 4/1997 | Logg ........................... | 434/38 |
| 5,627,564 A | 5/1997 | Yang .......................... | 345/158 |
| 5,699,067 A | 12/1997 | Brown et al. ............... | 342/176 |
| 6,614,419 B1 | 9/2003 | May .......................... | 345/156 |
| 6,670,908 B2 | 12/2003 | Wilson et al. ............ | 342/26 R |
| 2006/0164287 A1* | 7/2006 | Holt et al. .................... | 342/22 |

* cited by examiner

*Primary Examiner*—Thomas H. Tarcza
*Assistant Examiner*—Harry Liu
(74) *Attorney, Agent, or Firm*—Scott R. Thompson

(57) ABSTRACT

A method to present easily understood images that represent targets that are detected through walls or other opaque barriers is disclosed. This method is particularly well suited for sense-through-the-wall radar systems. One of the main challenges of evolving STTW systems is that the practitioners of the technology are generally presented with complicated images to represent the gain adjusted amplitude of signals that are detected by the radar. Interpretation of images from prior art, which can be in the form of the radar speckle, target blob, wiggle plot, and horizontal amplitude intensity displays, shown in FIGS. 1 through 3, requires high levels of skill, focus, and time. Naturally, the foregoing places military and law-enforcement customers of the technology at considerable risk during hostile missions. This invention discloses a method that converts a typical radar signal into an image that is easily understood by a practitioner of STTW technology. This invention improves prior art by employing any combination of radar data interpretation with any combination of video feed overlay, hologram, target silhouettes, lines, borders, colored target representations and the like to concisely report target information to a STTW device operator.

2 Claims, 4 Drawing Sheets

METHOD TO PROVIDE GRAPHICAL REPRESENTATION OF SENSE THROUGH THE WALL (STTW) TARGETS

BACKGROUND OF THE INVENTION

This invention relates to visual improvements to Sense Through The Wall (STTW) radar displays. In the post 9-11 era, there is a growing need for STTW technologies to support urban combat, Special Forces, tactical entry, homeland security, law enforcement, fire protection, and search and rescue. While STTW systems have evolved during the past decade, these platforms are struggling to achieve market penetration in spite of an extreme demand for the technology. One of the largest barriers to widespread acceptance of STTW systems is the accompanying burden of expertise, focus, and response time that is needed to interpret the graphical user interfaces that are currently presented to practitioners of the technology. The method disclosed herein causes a computer, embedded microprocessor, and the like to employ the output results of STTW radar signal classification algorithms to select and display an image that represents the target that is detected on the opposite side of any visual barrier. In an optimal embodiment of this invention, the method further causes the foregoing electronic hardware or software to superimpose a target image over a live video stream of the area in front of the radar. This approach supersedes the blob-like, wiggle plot, and radar speckle images like those that commonly used by evolving STTW systems; examples of these displays are shown in FIGS. 1 through 3.

The quest of providing easy to understand radar visual displays has been an on-going challenge since the infancy of radar in the 1940's. Early radar displays comprised blob-like images that while difficult to interpret are still in common use in both STTW and non-STTW platforms. One of the earliest overlay radar displays, which employs etched optics to superimpose fictitious terrain data over a CRT radar screen, was disclosed by Bomzer in 1961 under U.S. Pat. No. 2,984,915. His invention, which was designed primarily for training purposes, enabled realistic radar scenes of urban areas to be superimposed over ambient displays of radar training data. The method provides trainees with a realistic visual of radar targets and background clutter from simulated data. Balding also patented a simulation support device in 1966 under U.S. Pat. No. 3,229,018 that overlays e-scope and terrain clearance data to provide a simulated scan on a map film slide made up of contour levels of varying transparency with each shade representing a different elevation. A radar display scheme that employs electronic hardware to provide similar elevation data of landmass radar on a live display was patented by Marrero under U.S. Pat. No. 3,413,402 in 1968. The principal object of Marreo's system is to provide a means for storing and recovering elevation data in such a manner that it alleviates some of the display limitations of prior art. Other relevant prior art, filed under U.S. Pat. No. 4,384,286 on May 17, 1983 by DiToro, employs a processor to determine the appropriate position to display a detected object on a radar screen that represents the actual coordinates of the target.

Like this invention, most of the more recently dated prior art relies on methods that cause a computer, embedded processor, or other electronic hardware to optimally display a target. A generic radar display that was patented by Allen on Jul. 31, 1990 under U.S. Pat. No. 4,944,679 employs software controlled generic radar display algorithms to cause a high resolution color monitor to display radar sweep, compass rose, front panel symbology, and diagnostic information. This invention, which relates particularly to the field of simulation training devices, further provides a target generator that displays simulated target information in a standard Plan Position Indicator format. On Apr. 1, 1997 Logg was awarded U.S. Pat. No. 5,616,031 for a system and method of shadowing an object in motion to be used in a helicopter flight simulator having improvements in visual cues and modeling. On Dec. 16, 1997 Brown was awarded U.S. Pat. No. 5,699,067, which discloses a high capacity complex radar plot display with low CPU loading. The invention includes a display process that causes a graphics window server to render "walking worm" animation a display console. The animation comprises a chain of symbols that represent the current and several of the past positions of the target. An endless loop causes the most current symbol to be plotted and the most dated symbol (or target position) to be erased; the resulting moving target history is iteratively displayed in an endless loop to render the animation.

There is an abundant volume of prior art that employs symbol overlay techniques to present complex data or user interface menus to an end-user. On May 21, 1996 Smalanskas et al. obtained U.S. Pat. No. 5,519,410 for a virtual image display management system with a heads-up display to enable the operator of an automobile or other equipment to focus on primary functions, such as vehicle operation, while providing secondary information within the operator's primary visual field; without requiring the operator to refocus. Like the present invention, Smalanskas employs several secondary functions that display combinations of analog/digital symbology, icon representation, target silhouette representation, alphanumeric text, and static or motion picture format. In a separate disclosure Bertram patented two video receiver displays in February 1997 that use software algorithms to cause interactive images of a menu system to overlay live television video under U.S. Pat. Nos. 5,602,597 and 5,606,374. Betram's approach combines a video display, which may be a television receiver with associated set top device, an intelligent television receiver, or a personal computer system enabled for television display, and a remote control which controls modification of the visual images displayed. His invention also includes cooperative display controller and video reception circuitry that causes full motion video visual images to occupy substantially the entirety of a viewable screen area and an overlying menu display to occupy a minor portion of the screen area over the full motion video.

Other image overlaying prior art includes an image displaying apparatus that was patented by Kanada et al. in U.S. Pat. No. 5,550,560 on Aug. 27, 1996. In this disclosure Kanada describes a system and method for detecting when an operator selects one of multiple objects from a projected image. Image data, object data and relative position data are used to cause a liquid crystal display screen to display a composite of both image and objects. When the operator presses a switch, a signal including the state of brightness from an optical sensor is entered into a brightness determinator of a personal computer.

While prior art adequately describes methods to display user interface data and symbols or icons that represent a target on LCD panels, PDA devices, VGA displays, helmet mounted displays, and any other type of display, even the state of the art lacks a method that specifically enables STTW platforms to convey complex radar data in a format that is easy to understand. Consequently, the state of the art presents complex visual displays like those that are shown in FIGS. 1 through 4, which tend to distract practitioners of the technology from the focus of their mission. Prior art and the state of the art fail in particular to use or describe a method or device that combines Sense-Through-The-Wall (STTW) radar data interpretation such as autocorrelation, statistical classification, biology modeled classifiers, and the like with 1D, 2D, and 3D graphical methods that present easily recognizable images to represent target information that is based on the composition of the detected target. A principle objective of this invention is to incorporate the foregoing into STTW systems so that the ease of using of the evolving technology is sufficient to foster widespread market acceptance by practitioners of the same.

BRIEF SUMMARY OF THE INVENTION

This invention describes a method to display Sense-Through-The-Wall (STTW) radar data that reduces the burden of skill and focus that is required to interpret the complex user interfaces that comprise the present STTW display state of the art. The disclosed method combines any form of data interpretation such as autocorrelation, statistical classification, biology modeled classifiers, and the like with pixel proper scale and placement of real or synthetic target images to form an intuitive, easily recognizable, visual display that is readily understood by practitioners of the technology. This type of information can be collected from any plurality of STTW sensors and can be displayed on any plurality of LCD panels, PDA devices, VGA displays, helmet mounted displays, and any other type of display.

BRIEF DESCRIPTION OF THE DRAWINGS

The below listed figures are intended to illustrate prior art and at least one embodiment of the disclosed invention. The drawings disclosed herein are not intended to limit the spirit or scope of this invention, which is encompassed by the claims of this disclosure.

DETAILED DESCRIPTION OF THE INVENTION

Figure 1:
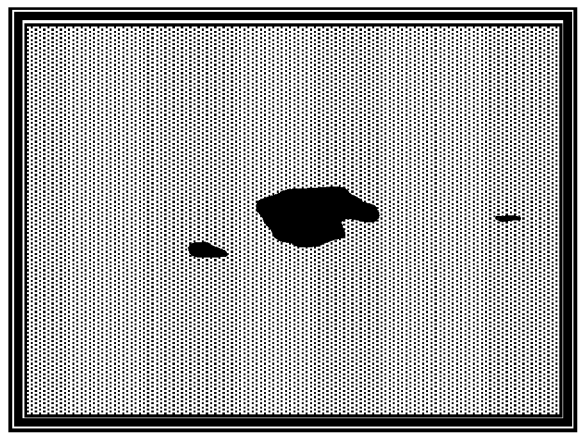
FIG. 1—Illustrates a radar speckle/radar blob STTW display image from prior art.
Figure 2:
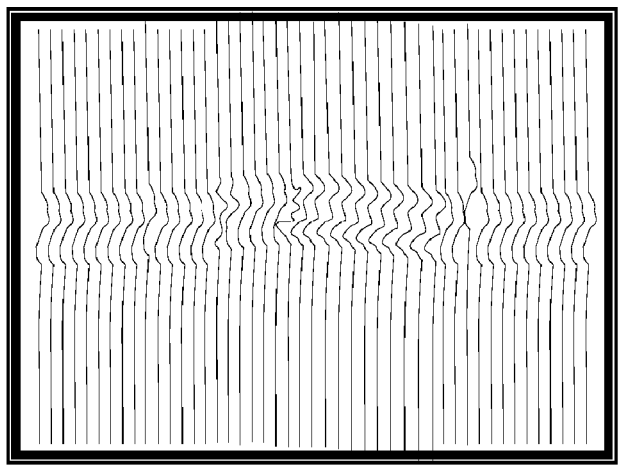
FIG. 2—Illustrates a 2D vertical squiggly line STTW display image from prior art.
Figure 3:
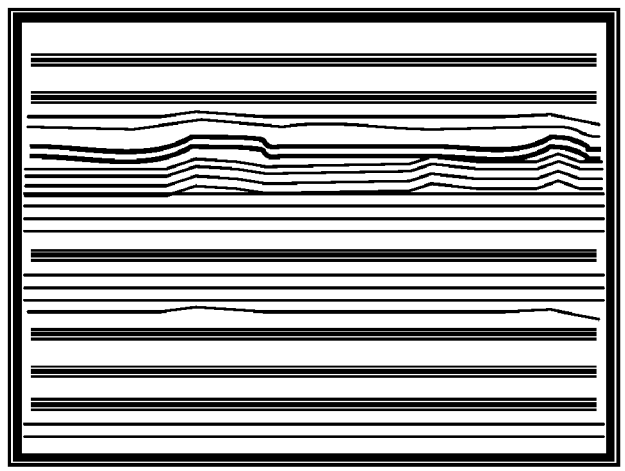
FIG. 3—Illustrates a horizontal line intensity plot STTW display image from prior art.
Figure 4:
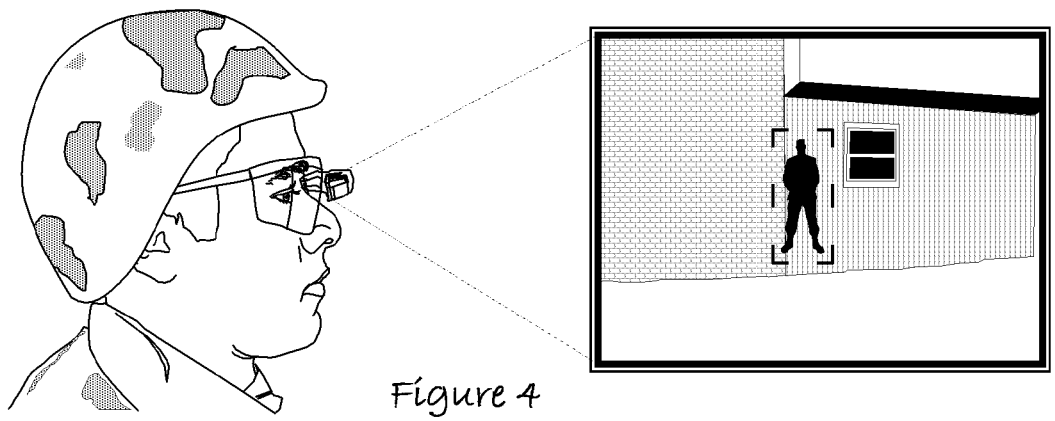
FIG. 4—Illustrates a heads-up display screen that is displaying a synthetic target image that is superimposed over a live video stream of the wall that is in between the radar and the target.

This invention is intended to improve the marketability of sense through the wall (STTW) systems by devising a method to display images that are easier to understand than the radar speckle, target blob, wiggle plot, and horizontal amplitude intensity displays that are used by the current state of the art and shown by example in FIGS. 1 through 3. The goal here is to make it easier for an STTW operator to rapidly understand, recognize, or respond to an object that is detected by the radar. In order to achieve the above and other objectives, the scope and spirit of this invention encompasses any method or device that combines Sense-Through-The-Wall (STTW) radar data interpretation such as autocorrelation, statistical classification, biology modeled classifiers, and the like with 1D, 2D, and 3D graphical methods cause any type of display device to present intuitive information that is based on the composition of the detected target.

Figure 5:
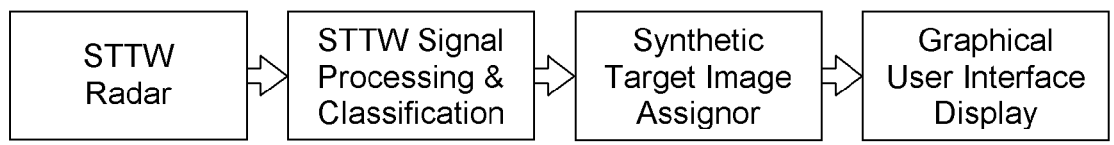
FIG. 5—Illustrates a block diagram of a preferred embodiment of this invention.

The components of a preferred embodiment of this invention, shown in the simplified block diagram in FIG. 5, include primarily a STTW sensor, a signal processor that characterizes signal return data from a STTW radar into any plurality of target classes, a method to determine the coordinates of each target that is detected in the STTW radar return data, a method to convert target coordinate and target class information into an overlay display, and a graphical conversion unit that causes a display device to present the STTW target and other useful information to any practitioner of the STTW technology.

Figure 6:
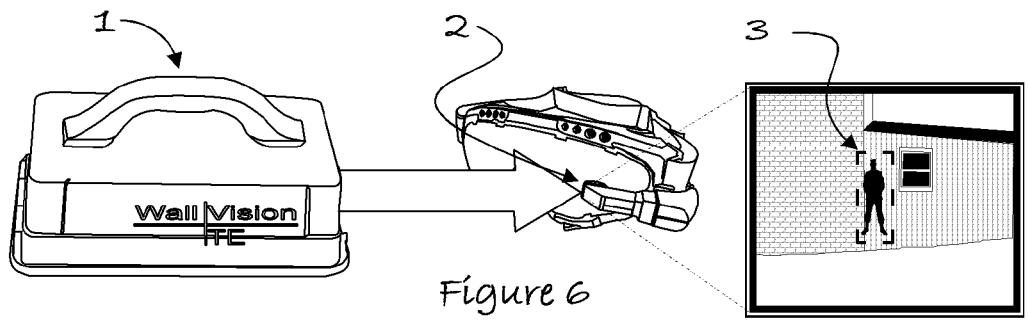
FIG. 6—Illustrates components that may comprise an embodiment of this invention.
Figure 7:
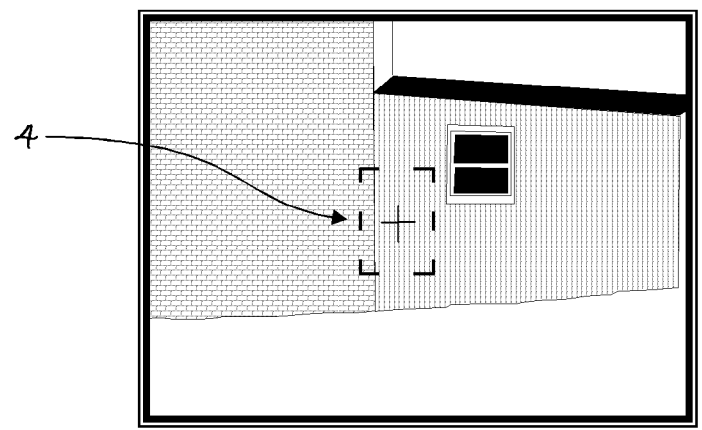
FIG. 7—Illustrates a display screen that is displaying a synthetic target cross-hair image that is superimposed over a live video stream of the wall that is in between the radar and the target.
Figure 8:
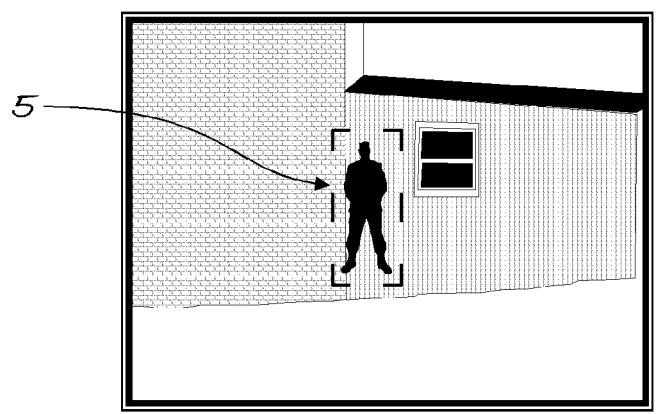
FIG. 8—Illustrates a display screen that is displaying a synthetic target silhouette and target cross-hair image that is superimposed over a live video stream of the wall that is between the radar and the target.
Figure 9:
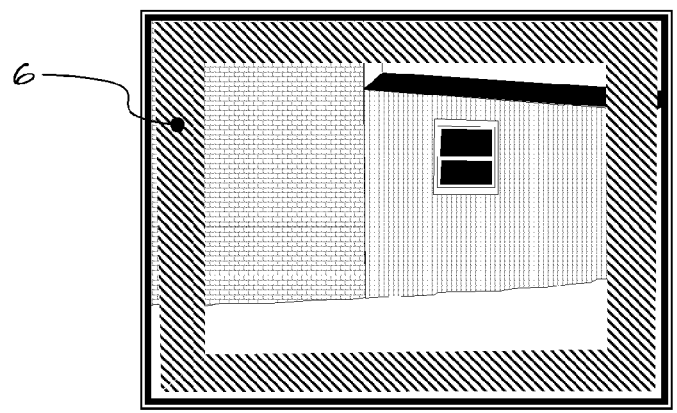
FIG. 9—Illustrates a display screen that is displaying a color coded graphic border image to represent a target; the image is superimposed along the outside edge of the display over a live video stream of the wall that is between the radar and the target.
Figure 10:
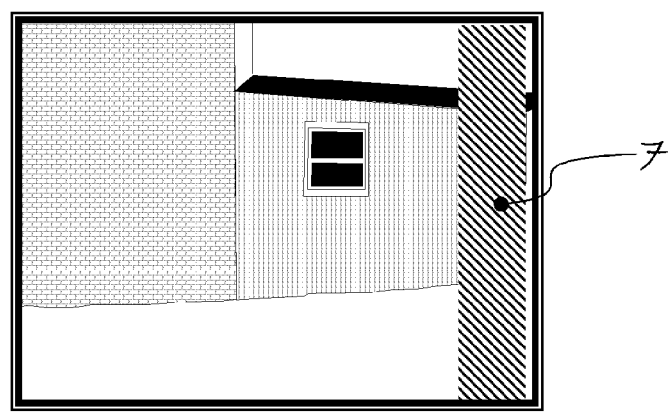
FIG. 10—Illustrates a display screen that is displaying a color coded bar graphic image to represent a target; the image is superimposed along the right side of the display over a live video stream of the wall that is between the radar and the target.

An optimal embodiment of this invention will include a dismount portable STTW radar 1 and a heads-up display device 2 that displays a synthetic target representation like the image that is shown at 3 in FIG. 6. The synthetic target silhouette image shown at 3 is just one example of the type of images that can be used to convey target information to the STTW operator. Other examples of synthetic target images that can be employed by this invention include targeting cross-hairs, shown at 4 in FIG. 7; targeting cross-hairs around a target silhouette, shown at 5 FIG. 8; a graphic warning border around a backdrop image, shown at 6 FIG. 9; and a smaller graphic warning border that appears to the right of the display, which is shown at 7 FIG. 10. These examples are not intended to limit the scope or spirit of this invention, which encompasses any graphic target representation that makes it easy for a practitioner of STTW technology to ascertain the composition of objects that are found in the radar return signal.

Figure 11:
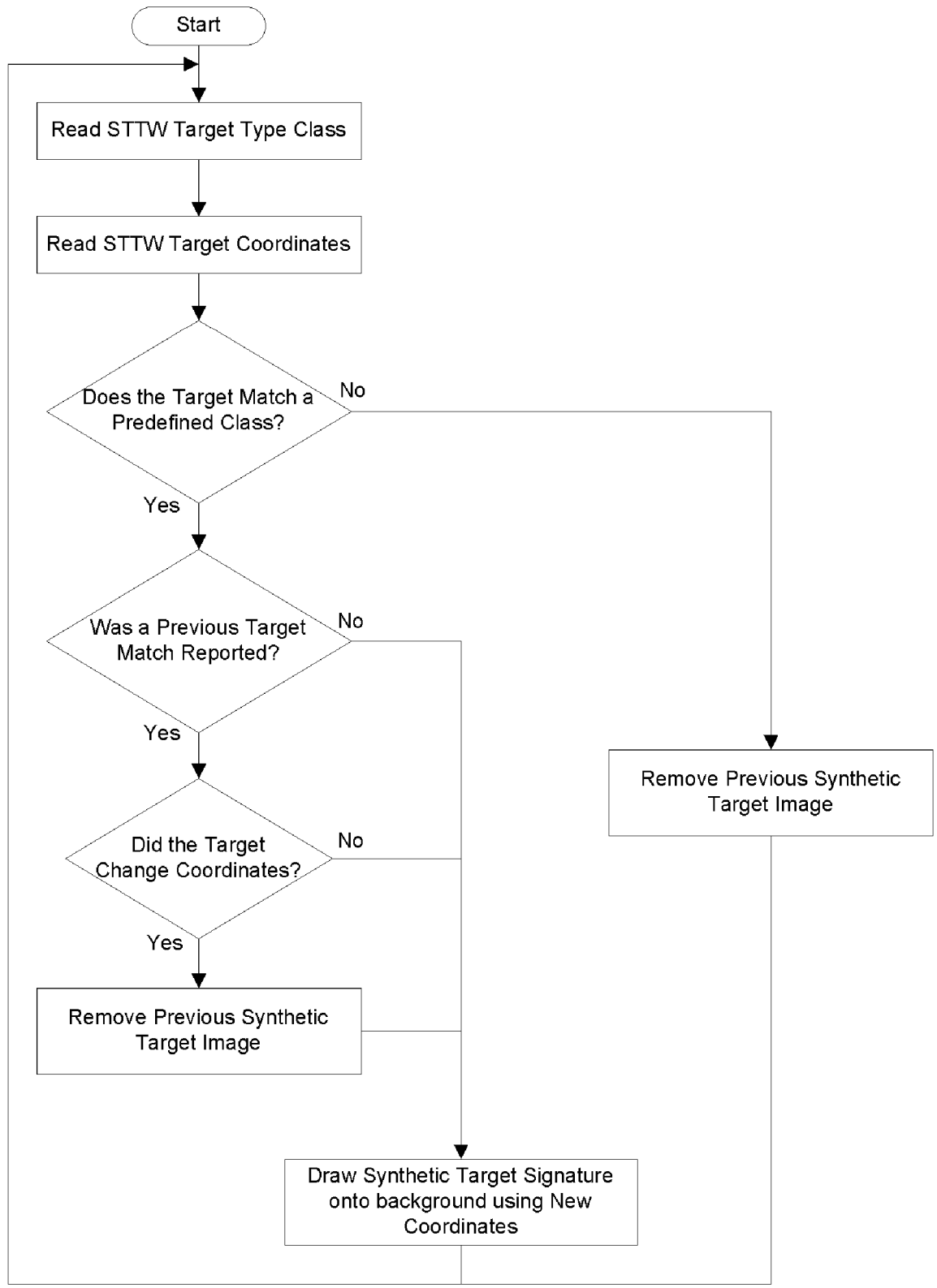
FIG. 11—Shows a flow chart of the method that is used to cause a sttw target image to appear on a display device.

The method of the preferred embodiment of this invention is outlined in the flow chart that is shown in FIG. 11. The flow chart represents a continuous loop that is iterated once for each target anomaly that is detected in each STTW returned signal. Each loop begins by employing any signal processing method that accepts STTW radar return data and characterizes target induced anomalies in the data into any plurality of classes. A subsequent method analyzes the STTW radar return data to determine the coordinates of each target anomaly in the data set. The preceding two methods are not specific to this invention and may vary among STTW systems. If a target is not found during a given iteration of the loop shown in FIG. 11, the disclosed method causes a display device to remove any synthetic target images from view. For each target that is found, the disclosed invention determines if the target was in the previous sensor measurement; this can be used to draw trail images that indicate the direction that the target is moving. This decision in the process is also used to determine if the previous image must be moved or re-scaled to accommodate a change in target coordinates.

During each iteration as described in the previous paragraph and outlined in FIG. 11, the method disclosed herein initially causes a computer, embedded controller, microprocessor, DSP, FPGA, PAL, or other electronic hardware to initiate signals on a display adaptor that causes a display device to present a real or synthetic image of the target. In an optimal embodiment of this invention, the process will cause the synthetic target image to be superimposed over a background image that may include a blank image, live video stream, longitude grid overlay, latitude grid overlay, area map overlay, an overlay map of objects in the area, menu overlay, or any image that can be used to enhance presentation or understanding of each detected target.

It is understood that the above embodiments are merely illustrative of the possible specific embodiments which may represent principles of the present invention. Other arrangements may readily be devised in accordance with these principals by those skilled in the art without departing from the scope and spirit of this invention.

What is claimed is:

1. A method to display Sense-Through-The-Wall (STTW) radar data on a display device to achieve a simplified yet intuitive form or representation of a target that is easily understood by a STTW radar operator that comprises in combination the following steps in an endless loop,
    (a) collecting radar return data from any sense through the wall radar device,
    (b) using any method or system to characterize the STTW radar return data into any plurality of classes,
    (c) associating a real or synthetic image representation of each target in the STTW radar return data that corresponds to the characterized class of each target,
    (d) using any method or system to determine the coordinates of targets that are detected in the STTW radar return data,
    (e) assigning a scale or size to the real or synthetic image representation of each target that is appropriate to the coordinates of the target so that the target image appears to reflect the physical distance between the STTW radar and the target,
    (f) forming a plot that assigns a relative size and display position for each real or synthetic target image that is correlated to the corresponding coordinates and scale of each detected target in the current STTW radar return data or by forming a plot that assigns any other type of graphic and any position on the display that may be used to optimally indicate the presence or composition of each STTW target,
    (g) using a display rendering cycle to cause a computing machine, embedded processor, microprocessor and the like to cause a display device to form a background image that may be any combination of a blank image, live video stream, longitude grid overlay, latitude grid overlay, area map overlay, an overlay map of objects in the area, menu overlay, or any image that can be used to enhance presentation or understanding of the target images,
    (h) using a display rendering cycle to cause a computing machine, embedded processor, microprocessor and the like to cause a display device to overlay the current plot image of the properly pixel positioned real or synthetic target images onto the background image.

2. A STTW virtual image display management for use in a plurality of STTW radar system and display devices of the type in claim 1 that comprises in combination,
    (a) a plurality of sense through the wall radar devices,
    (b) a plurality of display devices or monitoring systems,
    (c) a plurality of display adapters for interfacing STTW interface to a plurality of display devices or monitoring systems,
    (d) a plurality of video camera, CCD, or other image capturing device that collects live video images,
    (e) a processor for coupling display data from any plurality of STTW devices, data systems, communication systems, and image capturing devices to any plurality of display devices,
    (f) a virtual image display management system that causes any plurality of display devices to display any representation of targets that are detected by any plurality of STTW sensors,
    (g) a plurality of mode selection switch, keyboard, voice recognition device, or other input device coupled between any plurality of display devices or monitoring systems for selectively coupling data from any plurality of video capturing or STTW devices,
    (h) a mode selection switch, keyboard, voice recognition device, or other input device coupled to the display electronics or to the STTW radar for permitting data or command entry thereto,
    (i) a method for selectively displaying target images, background images, live background video stream, zoom effect, and other features to that optimize the display for a given STTW operator.

* * * * *